(12) United States Patent
Sutardja

(10) Patent No.: US 6,775,091 B1
(45) Date of Patent: Aug. 10, 2004

(54) REPEATABLE RUN-OUT COMPENSATION FOR DISK DRIVE

(75) Inventor: Pantas Sutardja, San Jose, CA (US)

(73) Assignee: Marvell International Ltd., Hamilton (BM)

(*) Notice: Subject to any disclaimer, the term of this patent is extended or adjusted under 35 U.S.C. 154(b) by 326 days.

(21) Appl. No.: 10/059,516

(22) Filed: Jan. 28, 2002

Related U.S. Application Data

(60) Provisional application No. 60/271,739, filed on Feb. 28, 2001.

(51) Int. Cl.$^7$ .............................................. G11B 5/596
(52) U.S. Cl. .................................................. 360/77.04
(58) Field of Search .......................... 360/77.02, 77.04, 360/75

(56) References Cited

U.S. PATENT DOCUMENTS

| | | | |
|---|---|---|---|
| 5,862,005 A | 1/1999 | Leis et al. ..................... 360/27 |
| 6,069,764 A | 5/2000 | Morris et al. ............. 360/77.04 |
| 6,545,835 B1 * | 4/2003 | Codilian et al. ......... 360/77.04 |

* cited by examiner

Primary Examiner—David Hudspeth
Assistant Examiner—Mitchell Slavitt

(57) ABSTRACT

An apparatus and a process for positioning a read/write head in a hard disk drive, and more particularly for using the phenomenon of repeatable run-out to efficiently compensate a servo loop used for positioning the head, is provided. The apparatus includes a processor and a read/write channel for a hard disk drive, wherein the processor is configured to calculate repeatable run-out values using position-error-signal (PES) values. The position-error-signal values are contained within an original servo wedge, which is stored on a disk medium. The original servo wedge includes a sync field, an identification field, and at least one position error field. The identification field includes a sync-mark. The processor is configured to use the at least one set of repeatable run-out values to generate a new servo wedge containing updated position information such that the actuator current is minimized. The processor is also configured to cause the new servo wedge to be written to the disk medium. The new servo wedge may be written to a predetermined location of the disk medium. The predetermined location may be determined by using a fixed time interval and the sync-mark of the original servo wedge. The original servo wedge may be erased or overwritten with data.

77 Claims, 3 Drawing Sheets

REPEATABLE RUN-OUT COMPENSATION FOR DISK DRIVE

CROSS-REFERENCE TO RELATED APPLICATION

Benefit of U.S. Provisional Patent Application Serial No. 60/271,739, filed on Feb. 28, 2001, is hereby claimed.

BACKGROUND OF THE INVENTION

1. Field of the Invention

The present invention relates to an apparatus and a method for positioning a read/write head for a hard disk drive, and more particularly to using the phenomenon of repeatable run-out to efficiently compensate a servo loop used for positioning the head.

2. Description of the Related Art

In a hard disk drive, positioning a read/write head over a disk medium is accomplished by having a servo loop lock to some predetermined servo positioning pattern. Such a pattern is usually referred to as a servo wedge. Referring to FIG. 1, a typical servo wedge 100 is a data string that contains several data fields, including a sync field 105, a sync-mark-plus-identification field 110, and some number of position error fields 115, 120, 125. The sync field 105 is used to lock the servo timing loop clock phase and frequency to the servo pattern. The sync-mark-plus-identification field 110 indicates both the circumferential position and the coarse radial position of the head. The position error fields 115, 120, 125 provide information concerning the fine radial positioning of the head.

Typically, the read/write head will be positioned by a servo unit to a fixed position as defined information contained in the servo wedges (servo track following). More specifically, the read/write head is mounted on a head arm. The head arm is part of an actuator assembly which conventionally comprises an actuator body or voice coil motor that rotates on a pivot assembly. The head arm is moved by the actuator to a predetermined servo track so that the read/write head is in the proper position to perform a desired operation (read or write). Ideally, the servo tracks are concentric with the spindle motor axis, and there is no force exerted on the actuator assembly when the disk is spinning and when the actuator is not driven. However, it is possible that either the servo track is not written concentrically during the servo write operation, or the disk platter is not exactly perpendicular to the axis of rotation. Because of these two possible contingencies, the actuator current which drives the actuator must be adjusted to "track-follow" even when there are no other external forces or disturbances.

The repeatable portion of these built-in disturbances is commonly known as repeatable run-out (RRO). The RRO phenomenon may be compensated for by analyzing the actuator current during servo track following. The built-in RRO is characterized by dividing the actuator current by the position-to-current transfer function of the servo loop. The run-out values can then be subtracted from the position error signal (PES) to compensate for the built-in RRO disturbance of the disk drive.

The process of characterizing the repeatable run-out values over the circumference of a disk is a fairly long process of averaging many revolutions of servo signals to suppress noise that exists in the system. The RRO values also vary with radial and circumferential position, thus necessitating a large matrix of RRO values that must be stored. If such a matrix is not stored, then the RRO values must constantly be recalculated on the fly; this leads to severe degradation of disk access performance. Conventionally, the RRO information is stored on the disk itself. It has been found that the most efficient storage method is to embed the RRO values within a servo wedge, usually one or two wedges before the RRO values are needed for RRO compensation.

Referring to FIG. 2, a common format for a servo wedge 200 containing RRO data is shown. Up to two RRO fields 205, 210 may be required, because the read process and the write process are performed at different track positions due to a physical offset between the read element and the write element on the read/write head. In some circumstances, however, RRO compensation is performed only for the write process, because in general, repeated attempts to perform the write process are not made, so it is more critical to perform the write process accurately the first time, whereas the read process may be retried if unsuccessful.

The storing of the matrix of RRO values may be performed during the drive characterization within the manufacturing process, or after the original servo wedge has been written. For this reason, the servo channel and/or the hard disk controller (HDC) must be capable of writing the RRO matrix at the end of the servo wedge.

In the conventional methodology for repeatable run-out compensation, as described above, the additional one or two data fields devoted to RRO values have the effect of increasing the total size of the servo wedge, thus causing a reduction in the available disk space for user data, i.e., a loss of formatting efficiency. In recognition of this problem, the present invention provides an apparatus and method for eliminating the inefficiency of data formatting associated with the inclusion of one or more RRO fields without sacrificing accuracy in performing the repeatable run-out compensation.

SUMMARY OF THE INVENTION

The present invention is intended to address the need for providing repeatable run-out compensation for a servo in a high-speed read/write channel for a hard disk drive without the inefficiency of using valuable data storage space on a disk medium for sets of repeatable run-out values.

In one aspect, the invention provides an apparatus and a process for positioning a read/write head for a hard disk drive, and more particularly for using the phenomenon of repeatable run-out to efficiently compensate a servo loop used for positioning the head. The apparatus includes a read/write channel and a processor operating in a system that includes a read/write head, a disk medium, and an actuator for positioning the read/write head with respect to the disk medium. The disk medium includes at least one original servo wedge for providing position information to the servo. The original servo wedge includes a sync field, an identification field, and at least one position error field. The identification field includes a sync-mark. The processor is configured to instruct the read/write channel to retrieve the original servo wedge from the disk medium. The processor is also configured to calculate repeatable run-out values using position-error-signal values contained in the original servo wedge. The processor is also configured to use the repeatable run-out values to generate a new servo wedge that contains updated position information so that the actuator current is minimized. The processor is configured to instruct the read/write channel to write the new servo wedge to the disk medium. The new servo wedge may be written to a predetermined location of the disk medium. The predetermined location may be determined based upon a fixed time interval and the sync-mark of the original servo wedge. The original servo wedge may be erased or overwritten with data.

In another aspect, the invention provides a process for positioning a read/write head in a read/write channel for a hard disk drive. The process includes the steps of reading an original servo wedge from a disk medium, commencing to perform servo track following based on the original servo wedge, generating a set of position-error-signal (PES) values from the servo track following, calculating a first set of repeatable run-out values using the PES values, using the first set of repeatable run-out values to compensate a servo loop such that an amount of actuator current is minimized, generating a new servo wedge that includes information updated on the basis of the compensated servo loop, and writing the new servo wedge to the disk medium. The original servo wedge includes a sync field, an identification field, and at least two position error fields. The identification filed includes a sync-mark. The first set of repeatable run-out values is associated with a write element of the read/write head. The new servo wedge may be written to a predetermined location that does not overlap with a location of the original servo wedge. The predetermined location may be determined based upon a fixed time interval and a location of the sync-mark of the original servo wedge. The original servo wedge may be erased or overwritten with data.

DETAILED DESCRIPTION OF THE INVENTION

The present invention addresses the need for efficient data formatting of servo wedge data for positioning a read/write head for a hard disk drive, while maintaining accurate compensation for repeatable run-out.

Figure 1:
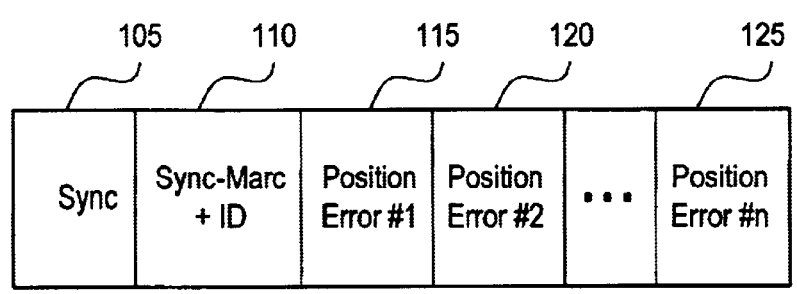
FIG. 1 shows a first data format for a conventional servo wedge according to the prior art.
Figure 2:
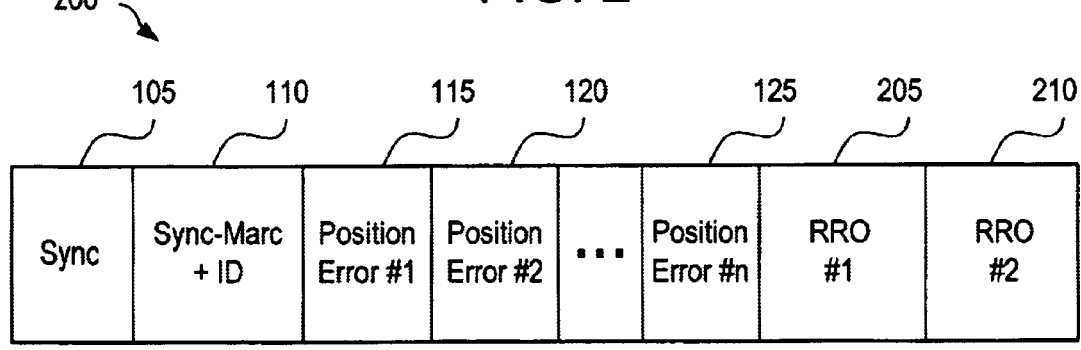
FIG. 2 shows a second data format for a conventional servo wedge, including fields for repeatable run-out values, according to the prior art.
Figure 3:
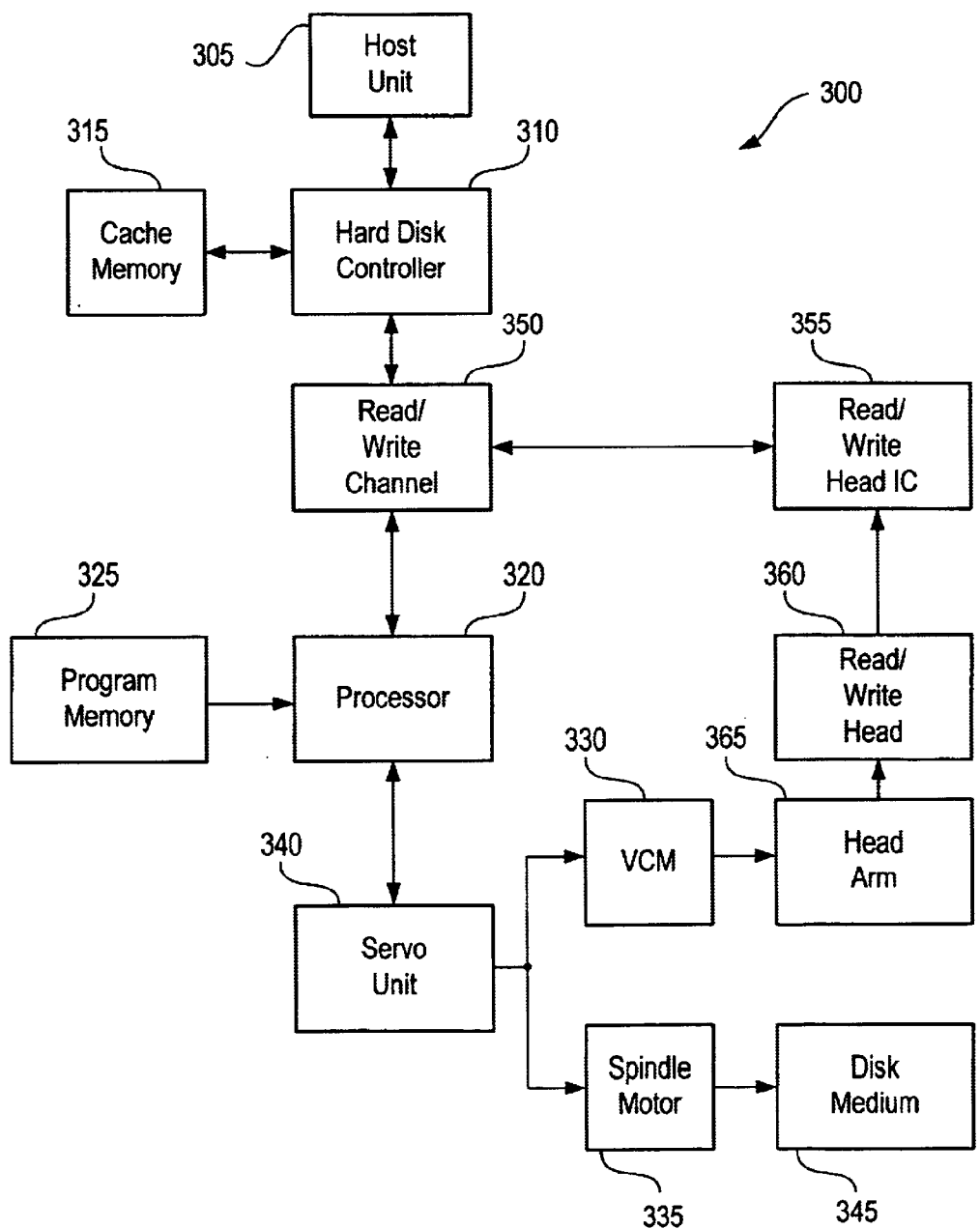
FIG. 3 shows a block diagram for a system including a read/write channel for a hard disk drive according to one exemplary embodiment of the present invention.

Referring to FIG. 3, a block diagram of a computing system 300 that includes a read/write channel for a hard disk drive is depicted. The system 300 includes a host unit 305, a hard disk controller 310, a cache memory 315, a processor unit 320, a program memory 325, a voice coil motor 330, a spindle motor 335, a servo unit 340, a disk medium 345, a read/write channel 350, a read/write head integrated circuit 355, a read/write head 360 and a head arm 365. The host unit 305 controls the operation of the computing system 300. The host unit 305 is connected to the hard disk controller 310. The hard disk controller 310 is in communication with the host unit 305, and receives instructions from the host unit 305 to read or write data. When data is transferred through the hard disk controller 310, it is preferably temporarily stored in the cache memory 315. The processor unit 320 receives instructions to read or write data from the host unit 305 via the hard disk controller 310. Associated with the processor unit 320 is the program memory 325 which contains further machine instructions for the processor unit 320. It should be appreciated that the processor unit 320 could be a standalone processor or an embedded processor. The processor unit 320 could be part of a system on a chip (SOC). Further, the processor unit 320 could be an ASIC, which would be hardware circuits that perform the function of the processor operating pursuant to program memory 325; in such a situation, program memory 325 may be used but is not required, as the ASIC is designed to perform any assigned functions. It should also be appreciated that the program memory 325 could be either volatile or non-volatile memory. The processor unit 320 controls the operation of the voice coil motor 330 and spindle motor 335 via the servo unit 340. The spindle motor 335 controls the rotational rate at which the disk medium 345 spins. The read/write channel 350 is connected to the hard disk controller 310, the processor 320 and the read/write head integrated circuit 355. The read/write channel 350 is responsible for encoding write data and decoding read data (under the control of the processor 320) and then transferring the data to the appropriate structure. Specifically, during a write operation, the read/write channel 350 provides data to the read/write head IC 355 and during a read operation, the read/write channel 350 provides data to the hard disk controller 310. The read/write head integrated circuit 355 provides write data to the read/write head 360 during a write operation, or receives read data from the read/write head 360 during a read operation. The read/write head 360 is mounted on the read/write head arm 365. The read/write head 360 is positioned in relation to the track on the disk medium 345 for which a desired operation (read/write) is to be performed. The read/write head 360 is positioned by the voice coil motor or actuator 330, which causes the read/write head 360 to preferably float over the disk medium 345. The voice coil motor 330 is operated to position the read/write head 360 on the basis of information contained in the servo wedge 200 (FIG. 2). The servo wedge 200 is a data string which is originally written on the disk medium 345 during manufacturing. The servo wedge 200 is a block of data that is angularly spaced from other servo wedges 200 and interspersed between data sectors around each track of the disk medium 345.

The process of the present invention characterizes the RRO field by reading many revolutions of position error signal (PES) data while performing servo track following based on the original servo wedge 200. Instead of writing the calculated RRO values back to the disk at the end of the existing servo wedges, the processor 320 causes the servo wedge to be rewritten with updated information but without separate RRO fields. The new servo wedge is written at a predetermined location on the disk medium 345. The processor 320 is configured to operate in accordance with the present invention and the hard disk drive is characterized within the manufacturing process. The expression manufacturing process is defined broadly to encompass all events prior to actual use in a final product.

Starting from the innermost track and moving radially outward, the RRO values are calculated by the processor 320 based on instructions contained in program memory 325. The RRO values are then used by the processor 320 to compensate the servo loop so that the amount of actuator current is minimized while maintaining servo track following. When the actuator current is minimized, the full compensation for repeatable run-out is achieved. By adjusting the data in the servo wedge based upon RRO values resulting in a minimized actuator current, the requirement for separately storing the RRO data becomes unnecessary, because the adjusted data has effectively already taken into account the RRO compensation.

Figure 4:
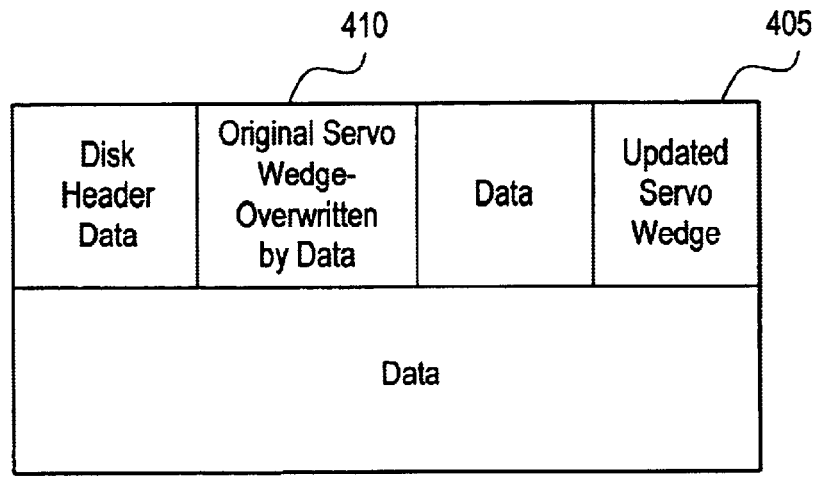
FIG. 4 shows a data format for a disk medium according to one exemplary embodiment of the present invention.

Referring to FIG. 4, the adjusted servo wedge data is then written to the disk in the form of a newly written servo wedge 405. A location on the disk for the updated servo wedge is selected by waiting a predetermined amount of time after the sync-mark in the original servo wedge 410. The original servo wedge 410 is of the same configuration as original servo wedge 200 (FIG. 2). The predetermined amount of time should be at least long enough so that the end of the original servo wedge is reached. The read/write head amplifier is then turned to the write mode and a newly written servo wedge 405 is written with the predetermined time offset relative to the original sync-mark. This process is repeated, with track stepping (or, typically, half-track stepping) required for writing a normal servo wedge. The newly written servo wedge 405, which contains data that has been adjusted resulting in a minimized actuator current, thus has a minimum RRO disturbance. Once this process is completed, the servo loop is made to lock to the newly written servo wedge 405, and the original servo wedge is erased, either by normal data overwriting or by purposeful erasing.

The best way to support the writing of the newly written servo wedge 405 is to use the servo clock recovered from locking to the original servo wedge 200. In this way, nearly the same level of servo wedge coherency as that provided by the original servo wedge may be achieved. Therefore, the servo rewrite function is preferably performed by the read/write channel, which typically is used for implementing the timing loop of the servo channel.

Figure 5:
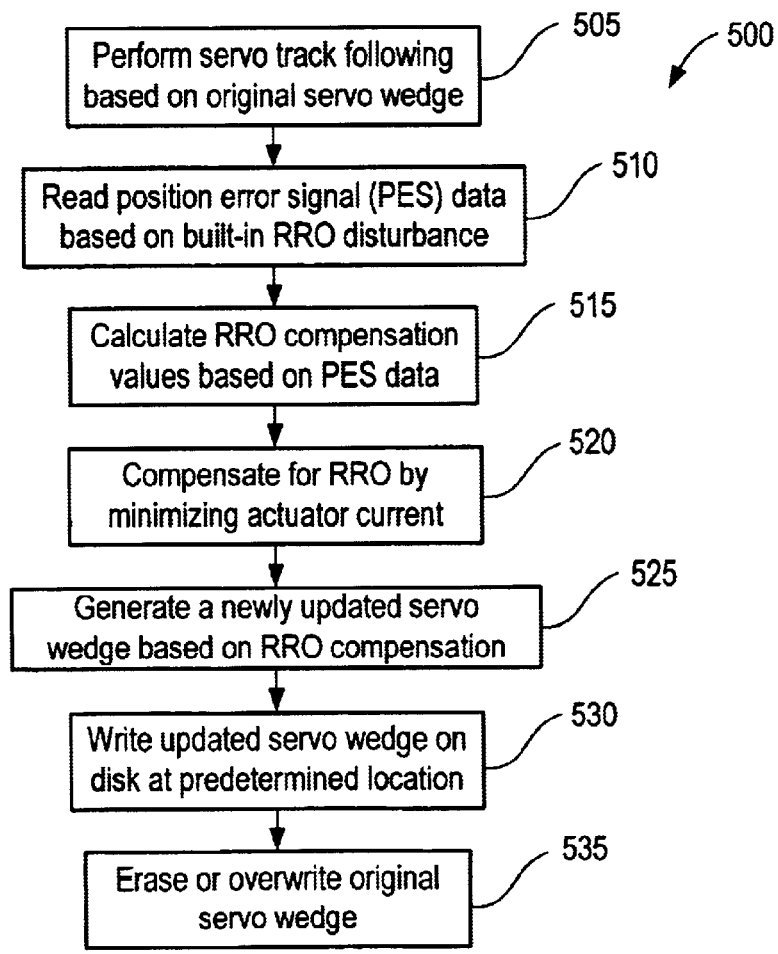
FIG. 5 shows a flow chart that illustrates a process for repeatable run-out compensation according to one exemplary embodiment of the present invention.

Referring to FIG. 5, a flow chart illustrates a process 500 of one exemplary embodiment of the present invention. In the first step 505, the original servo wedge 200 data is used to initiate servo track following. In the second step 510, the built-in RRO disturbance will generate PES data, which is read by the read/write head 360. In the third step 515, the PES data is used to calculate the RRO values. In the fourth step 520, the RRO values are used to compensate for the RRO disturbance and minimize the actuator current. In the fifth step 525, the newly updated servo wedge 405 data is generated as a result of the RRO compensation. The newly updated servo wedge 405 is written onto the disk medium 345 at a predetermined location in the sixth step 530. Finally, in the seventh step 535, the original servo wedge 200 is overwritten by data or erased.

While the present invention has been described with respect to what is presently considered to be the preferred embodiment, i.e., an implementation in a read/write channel for a hard disk drive, it is to be understood that the invention is not limited to the disclosed embodiment. To the contrary, the invention is intended to cover various modifications and equivalent arrangements included within the spirit and scope of the appended claims. For example, it is to be understood that the invention is applicable to other apparatus that require high-speed data transmission using mechanical components, such as other types of computer disk drives and compact disk devices. The scope of the following claims is to be accorded the broadest interpretation so as to encompass all such modifications and equivalent structures and functions.

What is claimed is:

1. Apparatus in a hard disk drive having a read/write head, a disk medium, and an actuator for positioning the read/write head with respect to the disk medium, the disk medium including at least one original servo wedge, the at least one original servo wedge including a sync-mark, said apparatus comprising:

a processor; and a read/write channel in communication with the processor, the processor configured to:
(a) instruct the read/write channel to retrieve the at least one original servo wedge from the disk medium,
(b) calculate at least a first set of repeatable run-out values using position-error-signal (PES) values contained in the at least one original servo wedge,
(c) use at least the first set of repeatable run-out values to generate a new servo wedge containing updated position information such that the actuator current is minimized; and
(d) instruct the read/write channel to supply the new servo wedge to the read/write head for storage on the disk medium.

2. The apparatus of claim 1, wherein the processor is configured to instruct the read/write channel/write to supply the new servo wedge to the read/write head for storage on the disk medium at a determined location that does not overlap with a location of the at least one original servo wedge.

3. The apparatus of claim 2, wherein the processor is configured to determine the determined location on the basis of a fixed time and a location of the sync-mark of the original servo wedge.

4. The apparatus of claim 3, wherein the original servo wedge includes an identification field and the sync-mark is located within the identification field.

5. The apparatus of claim 1, wherein the processor is further configured to cause the overwriting of the at least one original servo wedge with data.

6. The apparatus of claim 1, wherein the processor is further configured to cause the erasing of the at least one original servo wedge.

7. The apparatus of claim 1, wherein the processor is further configured to calculate a second set of repeatable run-out values using position-error-signal (PES) values contained in the at least one original servo wedge, and the processor is still further configured to use the first and second sets of repeatable run-out values to generate the new servo wedge, wherein the first set of repeatable run-out values is associated with a write element of the read/write head, and the second set of repeatable run-out values is associated with a read element of the read/write head.

8. In an apparatus in a hard disk drive having a processor, a read/write channel, a read/write head, a disk medium, and an actuator for positioning the read/write head with respect to the disk medium, the disk medium including at least one original servo wedge, the at least one original servo wedge including a sync-mark, a method comprising:

instructing the read/write channel to retrieve the at least one original servo wedge from the disk medium, calculating at least a first set of repeatable run-out values using position-error-signal (PES) values contained in the at least one original servo wedge, using at least the first set of repeatable run-out values to generate a new servo wedge containing updated position information such that the actuator current is minimized; and instructing the read/write channel to supply the new servo wedge to the read/write head for storage on the disk medium.

9. The method of claim 8, further comprising instructing the read/write channel to supply the new servo wedge to the read/write head for storage on the disk medium at a determined location that does not overlap with a location of the at least one original servo wedge.

10. The method of claim 9, further comprising determining the determined location on the basis of a fixed time and a location of the sync-mark of the original servo wedge.

11. The method of claim 10, wherein the original servo wedge includes an identification field and the sync-mark is located within the identification field.

12. The method of claim 8, further comprising causing the overwriting of the at least one original servo wedge with data.

13. The method of claim 8, further comprising causing the erasing of the at least one original servo wedge.

14. The method of claim 8, further comprising calculating a second set of repeatable run-out values using position-error-signal (PES) values contained in the at least one original servo wedge, and using the first and second sets of repeatable run-out values to generate the new servo wedge, wherein the first set of repeatable run-out values is associated with a write element of the read/write head, and the second set of repeatable run-out values is associated with a read element of the read/write head.

15. Apparatus in a hard disk drive having a processor, a read/write channel, a read/write head, a disk medium, and an actuator for positioning the read/write head with respect to the disk medium, the disk medium including at least one original servo wedge, the at least one original servo wedge including a sync-mark, the apparatus comprising:
    means for instructing the read/write channel to retrieve the at least one original servo wedge from the disk medium,
    means for calculating at least a first set of repeatable run-out values using position-error-signal (PES) values contained in the at least one original servo wedge,
    means for using at least the first set of repeatable run-out values to generate a new servo wedge containing updated position information such that the actuator current is minimized; and
    means for instructing the read/write channel to supply the new servo wedge to the read/write head for storage on the disk medium.

16. The apparatus of claim 15, further comprising means for instructing the read/write channel to supply the new servo wedge to the read/write head for storage on the disk medium at a determined location that does not overlap with a location of the at least one original servo wedge.

17. The apparatus of claim 16, further comprising means for determining the determined location on the basis of a fixed time and a location of the sync-mark of the original servo wedge.

18. The apparatus of claim 17, wherein the original servo wedge includes an identification field and the sync-mark is located within the identification field.

19. The apparatus of claim 15, further comprising means for causing the overwriting of the at least one original servo wedge with data.

20. The apparatus of claim 15, further comprising means for causing the erasing of the at least one original servo wedge.

21. The apparatus of claim 15, further comprising means for calculating a second set of repeatable run-out values using position-error-signal (PES) values contained in the at least one original servo wedge, and means for using the first and second sets of repeatable run-out values to generate the new servo wedge, wherein the first set of repeatable run-out values is associated with a write element of the read/write head, and the second set of repeatable run-out values is associated with a read element of the read/write head.

22. A computer-readable media having stored thereon:
    a first set of machine instructions controlling the instructing of a read/write channel to retrieve at least one original servo wedge from a disk medium,
    a second set of machine instructions controlling the calculating of at least a first set of repeatable run-out values using position-error-signal (PES) values contained in the at least one original servo wedge,
    a third set of machine instructions controlling the use of at least the first set of repeatable run-out values to generate a new servo wedge containing updated position information such that an actuator current controlling the positioning of a read/write head with respect to the disk medium is minimized; and
    a fourth set of machine instructions controlling the instructing of the read/write channel to supply the new servo wedge to the read/write head for storage on the disk medium.

23. The computer-readable media of claim 22, further having stored thereon a fifth set of machine instructions controlling the instructing of the read/write channel to supply the new servo wedge to the read/write head for storage on the disk medium at a determined location that does not overlap with a location of the at least one original servo wedge.

24. The computer-readable media of claim 23, further comprising means for determining the determined location on the basis of a fixed time and a location of the sync-mark of the original servo wedge.

25. The computer-readable media of claim 24, wherein the original servo wedge includes an identification field and the sync-mark is located within the identification field.

26. The computer-readable media of claim 22, further having stored thereon a sixth set of machine instructions controlling the overwriting of the at least one original servo wedge with data.

27. The computer-readable media of claim 22, further having stored thereon a seventh set of machine instructions controlling the erasing of the at least one original servo wedge.

28. The computer-readable media of claim 22, further having stored thereon an eighth set of machine instructions controlling the calculating of a second set of repeatable run-out values using position-error-signal (PES) values contained in the at least one original servo wedge, and a ninth set of machine instructions controlling the use of the first and second sets of repeatable run-out values to generate the new servo wedge, wherein the first set of repeatable run-out values is associated with a write element of the read/write head, and the second set of repeatable run-out values is associated with a read element of the read/write head.

29. An apparatus in a hard disk drive having a read/write head, a disk medium, and an actuator for positioning the read/write head with respect to the disk medium, the disk medium including at least one original servo wedge, the at least one original servo wedge including a sync-mark, said apparatus comprising:
    a processor; and
    a read/write channel in communication with the processor,
    the processor configured to:
        (a) perform servo track following on the basis of the original servo wedge,
        (b) generate a set of position-error-signal (PES) values from the servo track following;
        (c) calculate a first set of repeatable run-out values using the PES values, the first set of repeatable run-out values being associated with a write element of the read/write head, (d) use the first set of repeatable run-out values to compensate a servo loop such that an amount of actuator current is minimized, (e) generate a new servo wedge that includes information updated on the basis of the compensated servo loop, (f) provide the new servo wedge to the read/write channel, and (g) cause the new servo wedge to be written to the disk medium.

30. The apparatus of claim 29, further comprising a processor configured to write the new servo wedge to the disk medium at a predetermined location that does not overlap with a location of the original servo wedge.

31. The apparatus of claim 30, further comprising a processor configured to determine the predetermined location on the basis of a fixed time and a location of the sync-mark of the original servo wedge.

32. The apparatus of claim 31, further comprising a processor configured to determine the predetermined location on the basis of a fixed time and the sync-mark of the original servo wedge, the sync-mark being located within an identification field included on the original servo wedge.

33. The apparatus of claim 31, further comprising a processor configured to overwrite the location of the original servo wedge with data.

34. The apparatus of claim 31, further comprising a processor configured to erase the original servo wedge.

35. The apparatus of claim 29, further comprising a processor configured to calculate a second set of repeatable run-out values using the PES values, the second set of repeatable run-out values associated with a read element of the read/write head, and a processor configured to use the first set of repeatable run-out values to compensate a servo loop using both the first set and the second set of repeatable run-out values to compensate the servo loop such that the amount of actuator current is minimized.

36. A process for a hard disk drive, comprising the steps of:

reading an original servo wedge from a disk medium;

commencing to perform servo track following on the basis of the original servo wedge, the original servo wedge including a sync-mark;

generating a set of position-error-signal (PES) values from the servo track following;

calculating a first set of repeatable run-out values using the PES values, the first set of repeatable run-out values being associated with a write element of the read/write head;

using the first set of repeatable run-out values to compensate a servo loop such that an amount of actuator current is minimized;

generating a new servo wedge that includes information updated on the basis of the compensated servo loop; and writing the new servo wedge to the disk medium.

37. The process of claim 36, the step of writing the new servo wedge to the disk medium comprising writing the new servo wedge to the disk medium at a predetermined location that does not overlap with a location of the original servo wedge.

38. The process of claim 37, a determination of the predetermined location being made on the basis of a fixed time and a location of the sync-mark of the original servo wedge.

39. The process of claim 38, the determination of the predetermined location being made on the basis of a fixed time and the sync-mark of the original servo wedge, the sync-mark being located within an identification field included on the original servo wedge.

40. The process of claim 38, further comprising the step of overwriting the location of the original servo wedge with data.

41. The process of claim 38, further comprising the step of erasing the original servo wedge.

42. The process of claim 36, further comprising the step of calculating a second set of repeatable run-out values using the PES values, the second set of repeatable run-out values associated with a read element of the read/write head, and the step of using the first set of repeatable run-out values to compensate a servo loop comprising using both the first set and the second set of repeatable run-out values to compensate the servo loop such that the amount of actuator current is minimized.

43. An apparatus for a hard disk drive, comprising:

means for reading an original servo wedge from a disk medium;

means for commencing to perform servo track following on the basis of the original servo wedge, the original servo wedge including a sync-mark;

means for generating a set of position-error-signal (PES) values from the servo track following;

means for calculating a first set of repeatable run-out values using the PES values, the first set of repeatable run-out values being associated with a write element of the read/write head;

means for using the first set of repeatable run-out values to compensate a servo loop such that an amount of actuator current is minimized;

means for generating a new servo wedge that includes information updated on the basis of the compensated servo loop; and means for writing the new servo wedge to the disk medium.

44. The apparatus of claim 43, the means for writing the new servo wedge to the disk medium comprising means for writing the new servo wedge to the disk medium at a predetermined location that does not overlap with a location of the original servo wedge.

45. The apparatus of claim 44, a determination of the predetermined location being made on the basis of a fixed time and a location of the sync-mark of the original servo wedge.

46. The apparatus of claim 45, the determination of the predetermined location being made on the basis of a fixed time and the sync-mark of the original servo wedge, the sync-mark being located within an identification field included on the original servo wedge.

47. The apparatus of claim 45, further comprising means for overwriting the location of the original servo wedge with data.

48. The apparatus of claim 45, further comprising means for erasing the original servo wedge.

49. The apparatus of claim 43, further comprising means for calculating a second set of repeatable run-out values using the PES values, the second set of repeatable run-out values associated with a read element of the read/write head, and means for using the first set of repeatable run-out values to compensate a servo loop comprising using both the first set and the second set of repeatable run-out values to compensate the servo loop such that the amount of actuator current is minimized.

50. A computer-readable media having stored thereon:
a first set of machine instructions controlling the reading of an original servo wedge from a disk medium;
a second set of machine instructions controlling the commencing to perform servo track following on the basis of the original servo wedge, the original servo wedge including a sync-mark;
a third set of machine instructions controlling the generating of a set of position-error-signal (PES) values from the servo track following;
a fourth set of machine instructions controlling the calculating of a first set of repeatable run-out values using the PES values, the first set of repeatable run-out values being associated with a write element of the read/write head;
a fifth set of machine instructions controlling the using of a first set of repeatable run-out values to compensate a servo loop such that an amount of actuator current is minimized;
a sixth set of machine instructions controlling the generating of a new servo wedge that includes information updated on the basis of the compensated servo loop; and
a seventh set of machine instructions controlling the writing of the new servo wedge to the disk medium.

51. The computer-readable media of claim 50, further having stored thereon an eighth set of machine instructions controlling the writing of the new servo wedge to the disk medium at a predetermined location that does not overlap with a location of the original servo wedge.

52. The computer-readable media of claim 51, further having stored thereon a ninth set of machine instructions controlling the determination of the predetermined location on the basis of a fixed time and a location of the sync-mark of the original servo wedge.

53. The computer-readable media of claim 52, further having stored thereon a tenth set of machine instructions controlling the determination of the predetermined location on the ass of a fixed time and the sync-mark of the original servo wedge, the sync-mark being located within an identification field included on the original servo wedge.

54. The computer-readable media of claim 52, further having stored thereon an eleventh set of machine instructions controlling the overwriting of the location of the original servo wedge with data.

55. The computer-readable media of claim 52, further having stored thereon a twelfth set of machine instructions controlling the erasing of the location of the original servo wedge.

56. The computer-readable media of claim 50, further having stored thereon a thirteenth set of machine instructions for calculating a second set of repeatable run-out values using the PES values, the second set of repeatable run-out values associated with a read element of the read/write head, and a fourteenth set of machine instructions for controlling the using of the first set of repeatable run-out values to compensate a servo loop using both the first set and the second set of repeatable run-out values to compensate the servo loop such that the amount of actuator current is minimized.

57. A disk drive system comprising:
a read/write head;
a disk medium;
an actuator for positioning the read/write head with respect to the disk medium;
a processor; and
a read/write channel in communication with the processor,
the disk medium including at least one original servo wedge,
the at least one original servo wedge including a sync-mark,
the processor configured to:
(a) instruct the read/write channel to retrieve the at least one original servo wedge from the disk medium,
(b) calculate at least a first set of repeatable run-out values using position-error-signal (PES) values contained in the at least one original servo wedge,
(c) use at least the first set of repeatable run-out values to generate a new servo wedge containing updated position information such that the actuator current is minimized, and
(d) instruct the read/write channel to supply the new servo wedge to the read/write head for storage on the disk medium.

58. The disk drive system of claim 57 further comprising a processor configured to instruct the read/write channel to supply the new servo wedge to the read/write head for storage on the disk medium at a determined location that does not overlap with a location of the at least one original servo wedge.

59. The disk drive system of claim 58 further comprising a processor configured to determine the determined location on the basis of a fixed time and a location of the sync-mark of the original servo wedge.

60. The disk drive system of claim 59 wherein the original servo wedge includes an identification field and the sync-mark is located within the identification field.

61. The disk drive system of claim 58 wherein the processor is further configured to cause the overwriting of the at least one original servo wedge with data.

62. The disk drive system of claim 58 wherein the processor is further configured to cause the erasing of the at least one original servo wedge.

63. The disk drive system of claim 58 wherein the processor is further configured to calculate a second set of repeatable run-out values using position-error-signal (PES) values contained in the at least one original servo wedge, and the processor is further configured to use the first and second sets of repeatable run-out values to generate the new servo wedge, wherein the first set of repeatable run-out values is associated with a write element of the read/write head, and the second set of repeatable run-out values is associated with a read element of the read/write head.

64. A method in a disk drive system comprising:
instructing a read/write channel to retrieve at least one original servo wedge from a disk medium,
calculating at least a first set of repeatable run-out values using position-error-signal (PES) values contained in the at least one original servo wedge,
using at least the first set of repeatable run-out values to generate a new servo wedge containing updated position information such that an actuator current controlling the positioning of a read/write head is minimized,
providing the new servo wedge to a read/write channel; and
instructing the read/write channel to supply the new servo wedge to the read/write head for storage on the disk medium.

65. The method in a disk drive system of claim 64 further comprising instructing the read/write channel to supply the new servo wedge to the read/write head for storing on the disk medium at a determined location that does not overlap with a location of the at least one original servo wedge.

66. The method in a disk drive system of claim 65 wherein the determined location is determined on the basis of a fixed time and a location of the sync-mark of the original servo wedge.

67. The method in a disk drive system of claim 66 wherein the original servo wedge includes an identification field and the sync-mark is located within the identification field.

68. The method in a disk drive system of claim 64 further comprising causing the overwriting of the at least one original servo wedge with data.

69. The method in a disk drive system of claim 64 further comprising erasing the at least one original servo wedge.

70. The method in a disk drive system of claim 64 further comprising calculating a second set of repeatable run-out values using position-error-signal (PES) values contained in the at least one original servo wedge, and further comprising using the first and second sets of repeatable run-out values to generate the new servo wedge, wherein the first set of repeatable run-out values is associated with a write element of the read/write head, and the second set of repeatable run-out values is associated with a read element of the read/write head.

71. A method of manufacturing/assembling a hard disk drive system comprising:
  coupling a read/write channel, a processor, an actuator, a read/write head and a disk medium; and
  characterizing the disk drive system,
  the disk medium including an original servo wedge, the original servo wedge including a sync-mark,
  the disk drive system characterized to:
    (a) perform servo track following on the basis of the original servo wedge,
    (b) generate a set of position-error-signal (PES) values from the servo track following,
    (c) calculate a first set of repeatable run-out values using the PES values, the first set of repeatable run-out values being associated with a write element of the read/write head,
    (d) use the first set of repeatable run-out values to compensate a servo loop such that an amount of actuator current is minimized,
    (e) generate a new servo wedge that includes information updated on the basis of the compensated servo loop, and
    (f) write the new servo wedge to the disk medium.

72. The method of claim 71 wherein the disk drive is further characterized to write the new servo wedge to the disk medium at a predetermined location that does not overlap with a location of the original servo wedge.

73. The method of claim 72 wherein the predetermined location is determined on the basis of a fixed time and a location of the sync-mark of the original servo wedge.

74. The method of claim 73 wherein the predetermined location is determined on the basis of a fixed time and a location of the sync-mark of the original servo wedge, the sync-mark being located within an identification field included on the original servo wedge.

75. The method of claim 73 wherein the disk drive system is further characterized to overwrite the location of the original servo wedge with data.

76. The method of claim 73 wherein the disk drive system is further characterized to erase the original servo wedge.

77. The method of claim 71 wherein the disk drive system is further characterized to calculate a second set of repeatable run-out values using the PES values, the second set of repeatable run-out values associated with a read element of the read/write head, and use both the first set and the second set of repeatable run-out values to compensate the servo loop such that the amount of actuator current is minimized.

* * * * *